Dec. 13, 1949     O. LINDFORS     2,490,877
MOTOR STARTING CONTROL SWITCH
Filed May 12, 1947     2 Sheets-Sheet 1

INVENTOR
ONNI LINDFORS
BY Paul L. Kirkee
ATTORNEY

Dec. 13, 1949      O. LINDFORS      2,490,877
MOTOR STARTING CONTROL SWITCH
Filed May 12, 1947      2 Sheets-Sheet 2
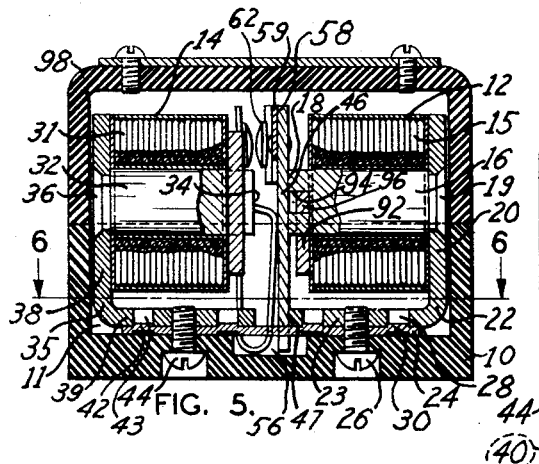
INVENTOR
ONNI LINDFORS
BY Paul L. Kishee
ATTORNEY Patented Dec. 13, 1949

2,490,877

UNITED STATES PATENT OFFICE 2,490,877

MOTOR STARTING CONTROL SWITCH

Onni Lindfors, Beloit, Wis., assignor to Fairbanks, Morse & Co., Chicago, Ill., a corporation of Illinois Application May 12, 1947, Serial No. 747,494

3 Claims. (Cl. 175—345)

1

This invention relates in general to improvements in the starting control of single phase alternating current motors, and has particular reference to an improved electromagnetically actuated switch which is especially suitable for use in controlling the starting circuit of such motors.

As is well known, a single phase alternating current motor of the induction type, requires the field excitation thereof to be of split or cross-phase character at least during motor starting, in order to develop sufficient starting torque for motor acceleration up to its normal running speed. The more usual or prevailing practice in connection with such motors, is to provide the motor with a main or running field and a starting field, and to utilize a suitable phase shifting device such as a capacitance, in the starting circuit, with means for reducing the effect of the starting circuit or rendering the same ineffective, as the motor approaches or attains normal running speed. While the so-called "capacitor-start" single phase motor offers definite advantages in a wide variety of uses, it is generally necessary in the usual circuit arrangements of such motors, to disconnect the condenser from the motor circuit preferably as the motor approaches but before it attains, normal operating speed, in order to prevent damage to or burn-out of the condenser. A number of different switch devices have been employed for this purpose, including the generally prevailing centrifugal or motor speed operated switch, and electromagnetic switches usually of conventional types, actuated in some instances by motor starting current to complete the condenser-start circuit and by a spring or weight to disconnect the condenser, and in other instances, by the voltage appearing across the starting field winding of the motor, to effect disconnection of the condenser. It has been found in practice that the electromagnetic cut-out switches prevailing in use, present a number of constructional and functional disadvantages, among which may be mentioned the tendency to contact-freezing, limitations of certain types thereof to substantially one mounting position in order to render the switch operative at all, uncertain operation of the switch in the event of material changes in line voltage, and the action of some switches to reinsert the condenser start circuit in response to low voltages attending relatively high stalling speeds of the motor.

2

With the foregoing in view, it is the principal purpose of the present invention to provide a control switch for the starting circuit of condenser-start motors in particular, which will operate in a positive manner, to disconnect the starting circuit at a given motor speed and independently of line voltage, load, rate of motor acceleration, or external vibrations to which the switch may at times, be subject.

Another equally important object is to afford a control switch for the purpose indicated, which in the event of low line voltage, will operate to re-connect the starting circuit only after the motor speed has dropped to a predetermined low value, thereby avoiding subjection of the condenser to high voltages which would result in damage to or rupture of the condenser.

A further object is to provide a control switch for condenser-start motors, wherein the operating characteristic of the switch is such that the contacts thereof will not close to introduce the starting circuit, upon deenergization of the motor consequent to opening of the motor supply circuit. There is thus avoided the undesirable regenerative effect which would obtain were the starting circuit re-connected during motor deceleration following opening of the supply circuit.

Yet another object is to provide a control switch of differential character, presenting opposed electromagnet coil assemblies one responsive to the main field current of the motor and the other to the voltage developed across the starting field winding, with a movable contact supporting armature between the coil assemblies and unbiased in either direction by springs, weights or the like, the armature being actuated solely by the differential of the magnetic forces of the coil assemblies, responding thereto in a positive manner and by substantially a snap-movement.

A still further object is to provide a control switch of relatively simple and economical construction, having the arrangement as expressed in the immediately foregoing object, wherein the polarities of the opposed electromagnet assemblies are the same substantially at any given instant in their energization, and wherein the armature is mounted and operatively related to the electromagnet assemblies, so that the armature will respond by snap-action, and will not chatter.

Other objects and advantages attending the present invention, will appear readily from the following description of a presently preferred embodiment thereof, as exemplified in the accompanying drawing, wherein.

Figure 1:
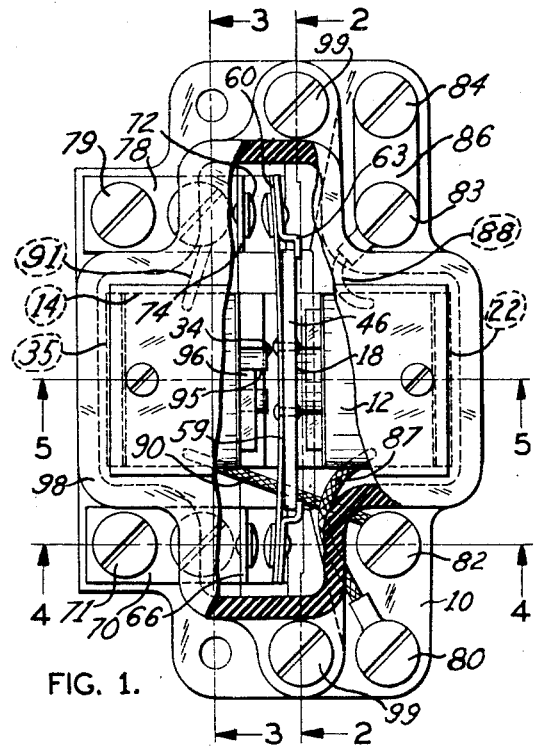
Fig. 1 is a plan view of the improved electromagnetic switch forming the subject of this invention, the view showing portions of the casing broken away to illustrate parts of the switch mechanism.
Figure 4:
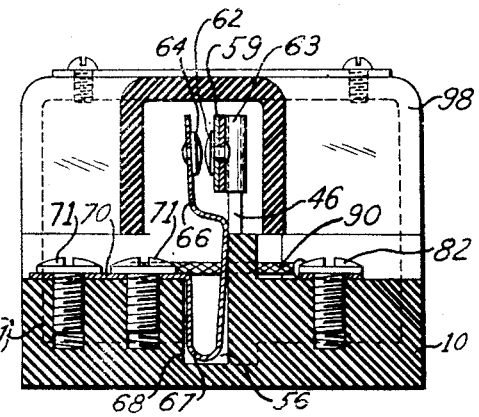

Figs. 4 and 5 are transverse sections of the switch, as viewed respectively, from the lines 4—4 and 5—5 in Fig. 1;

Fig. 6 is a sectional view in plan, near the base of the switch, as taken along the line 6—6 in Fig. 5;

Fig. 7 is a fragmentary view in perspective, of the detail of armature mounting, and Fig. 8 is a wiring diagram, illustrating the application of the switch to a capacity-start single phase induction motor.

Referring to the drawing and first to the physical construction of the presently improved switch or relay assembly as shown by Figs. 1 through 7, the switch parts are carried by a base structure 10 provided as an integral or one-piece member, of a suitable non-magnetic, electrically insulating material. Member 10 is centrally recessed to afford a chamber or pocket 11 for receiving the electromagnet coil assemblies 12 and 14 and the magnetic frame means interconnecting the cores of the latter.

Coil assembly 12 comprises by present preference, a coil or winding 15 (Fig. 5) mounted on a magnetic core 16 which may be of laminated form or a solid rod-like element as shown. Core 16 which provides a pole face 18 at one end, is firmly secured at its opposite end 19 to the leg 20 of an L-shape magnetic bracket 22. The other leg 23 of bracket 22 is in surface engagement with a bridge plate 24 of magnetic material, arranged over the bottom of the base recess 11. The bracket and bridge plate are secured to the base 10 preferably by a single screw 26, thereby securely mounting the coil assembly 12 to the base. Additionally, the bracket and bridge plate are relatively attached by small screws 27 (indicated in dotted outline in Fig. 6), and as a means for improving the structural and magnetic assembly of these parts, leg 23 of the bracket is apertured at 28, to receive portions 30 of plate 24 which may be pressed or extruded therefrom, and entered in the apertures.

Coil assembly 14 arranged in opposition to coil assembly 12, includes a coil or winding 31 on a core 32, the core presenting a pole face 34 in alignment with the core pole face 18 and spaced axially therefrom to a predetermined extent. The coil and core are carried by an L-shape bracket 35 of magnetic material, through firm securement of the end portion 36 of the core to the bracket leg 38, as in the manner shown in Fig. 5. The other leg 39 of bracket 35 is assembled to the bridge plate 24 in the manner provided for the bracket 22, as by small screws 40 (Fig. 3) and plate extrusions 42 in recesses 43 in bracket leg 39 (Fig. 5). The plate and bracket as so connected, are secured to the base member 10 by a screw 44.

Between the opposed, spaced-apart core pole faces 18 and 34 is a magnetic armature member 46 of plate form, the armature plate extending inwardly of the base recess 11 to the bridge plate 24 in a zone of the latter intermediate its ends and adjacent the terminal end 47 of bracket leg 23 (Figs. 5 and 6). The armature is pivotally carried by the bridge plate, and the manner of its pivotal mounting thereto is best shown by Figs. 2 and 5 to 7. As there appears, each of the opposite longitudinal margins of the bridge plate is provided with a stepped recess or notch, presenting a recess step 48 of appreciable inward extent, and a step 50 of lesser inward extent, defining thereby a marginal portion or flange 51 exposed in the notch as a whole. Projecting beyond each corner zone of the armature plate end margin 52 (Fig. 2), is a notched or undercut extension or ear 54 presenting a notch or recess 55, these ears being adapted for reception in the bridge plate notches.

Figure 2:
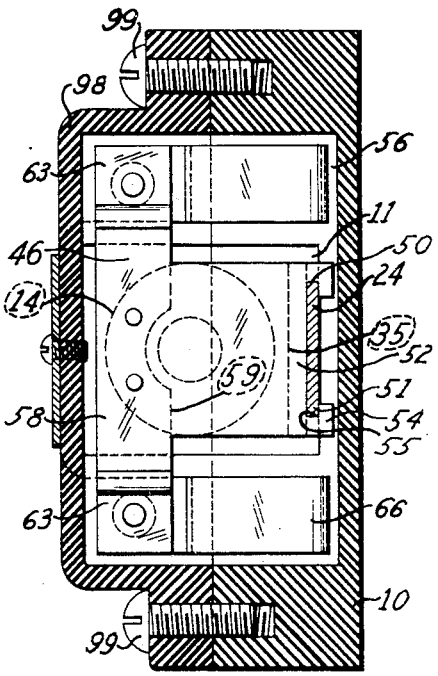
Fig. 2 is a longitudinal sectional elevation of the switch, as viewed from the line 2—2 in Fig. 1.
Figure 3:
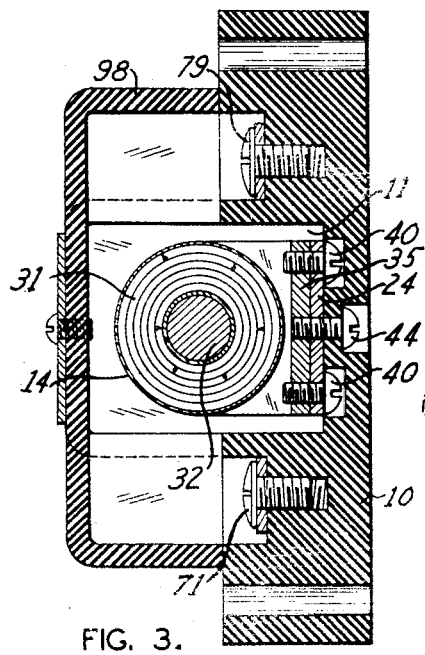
Fig. 3 is a further longitudinal sectional view, as taken along line 3—3 in Fig. 1.

Assembly of the armature to the bridge plate is effected before the L-shape bracket 22 of the coil assembly 12, is attached to the bridge plate in the manner hereinbefore described, and also, before assembly of the coil and frame structure to the base 10. The armature plate 46 is arranged substantially normal to the bridge plate 24, with the ears 54 seated in and through the larger recesses 48 of the latter. Thereafter, the armature plate is displaced to the smaller recesses 50 such as to seat the bridge plate flanges 51 in the ear recesses 55 (Figs. 2 and 7). In this position of the armature, the end margin 52 thereof may rest upon the bridge plate 24 as indicated in Fig. 2. It is to be noted here that the armature plate ears 54 have a loose fit upon the notch flanges 51 of plate 24, whereby to allow for free pivotal movement of the armature between the pole faces 18 and 34 and into magnetic contact with one or the other thereof. Retention of the armature plate in assembly to the bridge plate 24 is here afforded by the leg 23 of the bracket 22, which in the assembly securement of the leg and bridge plate (Figs. 5 and 6) following mounting of the armature, extends over the larger notches 48 with the terminal margin 47 thereof relatively adjacent the armature plate. The leg 23 thus is utilized to confine the armature to its operative support on the bridge plate 24, but with sufficient clearance to permit free pivotal movement of the armature as aforesaid.

As appears particularly in Figs. 2 and 5, a recess extension 56 below the bottom of the main recess 11 in base member 10, is provided for accommodating the projecting portions of the armature plate ears 54. Moreover and for a purpose to appear, in assembly connection of the armature plate 46 to the bridge plate 24, the location of its pivotal support is predetermined with respect to one of the coil assemblies, as the assembly 12, such that in contact of the armature with the core member 16, the armature will engage over substantially the full surface area of the core pole face 18 (Fig. 5). Consequently in the present embodiment, upon armature displacement to the opposite core pole face 34, it will appear from Fig. 5, that the armature will not contact the full surface of the latter pole face. Moreover and importantly herein, the armature as so mounted is free to move between the pole faces of the magnets, and is not constrained or biased in either direction by external means, such as springs or weights as commonly employed in magnet relays.

Suitably fixed to the free end 58 of the armature plate 46 is a spring strip element 59 of electrical conducting material, having its ends 60 freely projecting laterally from the opposite sides of the armature. On each end 60 is a switch contact 62, the contact preferably being riveted to the spring end and serving to attach to the latter, a stop element 63 extending to over-lap with the adjacent side of the armature (Fig. 1), the stop acting to limit displacement of the spring end in one direction and to retain the spring under an initial tension.

Arranged for cooperation with one of the armature-carried contacts 62 is a contact 64, the latter being riveted by preference to the free end of a spring finger 66. Finger 66 has a U-portion 67 located in a side recess 68 provided in the base member 10, and an end portion 70 secured to the base by screws 71 one of which is intended for circuit conductor connection to the finger. Cooperating with the other armature-carried contact 62 is a contact 72 riveted to the free end of a similar spring finger 74. U-portion 75 of the finger is located in base side recess 76, while the finger is secured to the base through its end portion 78, as by screws 79 which serve in addition, as binding posts for conductor connection to the finger.

As shown in Fig. 1, additional conductor connecting posts are provided on the base 10, as the screws 80 and 82 in one corner-zone of the base, and the screws 83 and 84 in an opposite corner-zone of the base. A removable conductor link 86 is shown interconnecting the screws 83 and 84. With further reference to Fig. 1, one end of the coil winding 15 is connected to the post 80 by a conductor or lead 87, while the opposite coil end is connected to post 83 by a conductor or lead 88. Coil winding 31 on the other hand, has one end connected to post 82 by a lead 90, and its other end to the inner one of the posts 79, by a lead 91.

In order to minimize eddy currents, the cores 16 and 32 are provided at the respective pole faces 18 and 34 thereof, with shading coils 92, each of which may be a single piece, plate-like element of suitable metal, as cadmium. Preferably, each core has a diametral slot in its pole face, as the slot 94 in core 16 (Fig. 5) and the slot 95 in core 32 (Fig. 1), to receive a leg portion 96 of the associated shading coil in assembly of the latter to the core. Further by present preference, the shading coils are relatively displaced by approximately 90 degrees, as is indicated in Figs. 1 and 5.

Completing enclosure of the switch mechanism is a cover 98 which is removably attached to the base by screws 99. The cover is adapted to the base 10 so that in assembly to the latter, the connector screws 80, 82, 83, 84 and the outer screws 71 and 79 of those securing the contact fingers 66 and 74 to the base, remain exposed and fully accessible for conductor connection thereto.

The electromagnetic switch or relay as described and illustrated, is particularly suitable for automatic control of the starting circuit of a single phase induction motor, and its application to such a motor is shown in the circuit diagram of Fig. 8. As there appears, the motor 100 includes a main or running field winding 102 and a starting field winding 103 connected together as at the connection 104. The motor is supplied from a suitable source of single phase alternating current through the supply mains 106 and 107 and a single pole main switch 108. Main 106 is connected to post 84 of the control switch, and through link 86, post 83 and lead 110, to the motor field connection 104. The opposite main 107 having the switch 108 therein, is connected to post 79 of the electromagnetic switch, and to terminal 111 of main motor winding 102 through lead 91, coil 31 of the electromagnetic coil assembly 14, lead 90, post 82, and a lead 112. Coil 15 of the coil assembly 12, is in shunt to the motor starting winding 103 through lead 88, post 83, lead 110, and through lead 87, post 80, and a lead 114 extending to the terminal 115 of the starting winding. The starting field phase shifting means is here shown as a capacitance or condenser 116 of an appropriate capacity value, connected by a lead 118 to post 80, and by a lead 119 to post 71 of the electromagnetic switch.

In the circuit arrangement shown, the switch coil 31 is adapted as a current coil, since it is in series with the main motor winding 102 and hence carries the main motor current. The opposed switch coil 15 being at all times in shunt with the starting winding 103, is adapted as a voltage coil, energized by the voltage appearing across the motor winding 103.

The operation of the control switch or relay is as follows:

Closure of the main line or supply switch 108 completes the supply circuit to motor winding 102, as from line 107, lead 91, switch coil 31, lead 90 and conductor 112, main or running winding 102 of the motor, conductor 110, and link 86 to the opposite line 106. Thus the main field of the motor will be energized, the current therethrough being relatively high at start and decreasing as the motor comes up to normal running speed. The line current through switch coil 31 energizes the latter to magnetize its core 32, whereupon the armature 46 is pulled over against the core pole face 34 with the result that the contacts 64 and 72 are bridged by the contacts 62 and spring conductor 59. The control switch thus closed, completes the starting circuit from line 107 through the bridged contacts 64—72, lead 119, condenser 116, lead 118, lead 114, motor starting winding 103, and thence to main 106 through lead 110 and link 86. With the starting and running windings energized in an out-of-phase condition as provided by the condenser 116, the motor accelerates toward running speed, but as this occurs, the voltage across starting winding 103 increases while the current through the running winding 102 decreases. The magnet assemblies 14 and 12 of the control switch, acting in opposition on the armature 46, are here adapted so that as the motor approaches normal running speed, the increasing voltage across starting winding 103 will cause sufficient energization of the magnet assembly 12 to actuate the armature 46 in opposition to the pull exerted by the magnet 14, the latter decreasing rapidly in its magnetic effect at such time, due to the decreasing main field current. The switch contacts thus will be opened, to open-circuit the starting circuit through the condenser 116. Thereafter the motor normally will attain and continue operation at its running speed.

The armature 46 of the switch, being unconstrained by springs, weights or the like, is positioned substantially solely in response to the differential of magnetic forces acting in opposition thereon, wherein the force of the current magnet 14 predominates during starting, whereby to hold the starting circuit closed, and the voltage magnet 12 overcomes the current magnet to open the starting circuit, as the motor attains a predetermined speed slightly below normal running speed. Through the differential magnetic operation of the switch, it will open the starting circuit at substantially the same motor speed as above indicated, each time the motor is started, and this will occur independently of line voltage, load, and rate of acceleration. Moreover, by reason of the manner of pivotal support of the armature 46 such that it contacts with the full area of the pole face 18 in the running operation of the motor, the armature is thus retained in a positive manner by the magnetic attraction of the magnet 12, against displacement away from the pole face 18 under the influence of vibrational forces. Full engagement of the armature with pole face 18 serves an additional and important purpose here, in that should the line voltage drop inordinately or the motor become overloaded, the switch will not operate to re-connect the starting circuit until the motor speed decreases to a predetermined low value. In either instance, the voltage energization of the magnet 12 will decrease, while the current energization of the current magnet 14 will increase, but the full contact of the armature with core face 18 and the air-gap between the armature and the opposed pole face 34 of the current magnet 14, are determined in the present embodiment of the invention, such that the magnetic attraction of the current magnet 14 will overcome the attractive force of the voltage magnet 12 only upon drop of the motor speed to said predetermined low value. Consequently, the switch operates to prevent re-connection of the condenser circuit under conditions of abnormal voltage or load which would impose abnormally high voltages across the condenser if then re-inserted, with resultant damage to or burn-out of the latter.

Upon opening of the line switch 108 to de-energize the motor, the control switch contacts will remain in open position at least during motor deceleration to stand-still, because of the armature contact with the core face 18 of the magnet 12 in shunt with the motor winding 103, permitting residual magnetic attraction to hold the armature against switch-closing movement. Therefore, there is avoided the undesirable regenerative effect during motor deceleration, which would obtain were the contacts closed to introduce the condenser in the motor circuit at such time. In some instances heretofore, a double-pole line switch has been utilized, as to open-circuit the condenser upon opening of the supply line, in order to avoid the regenerative effect. But the present arrangement eliminates any necessity for such expedient, the minimum requirement here being but a single pole switch, as the switch 108 indicated in Fig. 8.

The switch armature 46 being freely pivotally mounted as described, is thus conditioned for snap-movement to contact-open or contact-closed position in response to the differential of magnetic forces in favor of the voltage magnet 12 or the current magnet 14. Moreover, snap-movement of the armature which contributes materially to firm contact-closure and contact break-away, is facilitated to a marked extent by arranging the magnet coils 15 and 31 on the respective cores 18 and 32 so that the relative directions of the winding turns are opposite as shown, and by providing the illustrated particular circuit connection of the coils, whereby the positive half-cycle of alternating current energization of each of these coils, will occur substantially simultaneously or are out of phase only to a predetermined small extent, and similarly with respect to the negative half-cycle of energization. Consequently, the opposed pole faces 18 and 34 will have the same polarity, as north poles during the greater part of the positive half-cycles of coil energization, and south poles during the greater part of the negative half-cycles of coil energization. The lines of flux at the poles thus being opposed in direction of flow, will have the same approximate in-phase relationship. Accordingly, there is avoided any strengthening of one magnet by the other, so that the armature will respond quickly to the differentials of magnetic forces obtaining in motor starting as heretofore described. The foregoing is effective also, to prevent chattering of the armature which if otherwise allowed to occur especially at the time of contact make or break, would result in contact arcing with consequent damage to the contacts, and in inefficient action of the motor starting circuit until full contact-closure or contact-opening obtains.

The control switch as now described in respect to a presently preferred embodiment thereof, is compact, economical of manufacture, and affords the structural and operating characteristics and advantages herein expressed, which makes it particularly suitable for use with single phase condenser-start motors and the like, to provide positive control of the motor starting circuit.

Having described a presently preferred form of the invention, it is to be understood that modifications in the switch structure and arrangement of parts may be made without departing from the spirit and intended scope of the invention as defined by the appended claims.

I claim:

1. In a relay, an electromagnet assembly including a winding and core device and a movable armature extending adjacent the core of said device, a magnetic frame for supporting said winding and core device with the core thereof horizontal, said frame including a bracket having a horizontal margin and a plate element connected to the bracket, the plate element being provided with recesses in opposite sides thereof, said armature having portions thereof seated in said recesses and engaging the plate element such as to afford thereby, a relatively free pivotal support of the armature in substantially vertical upstanding position on the plate element, and said bracket in assembly connection with said plate element, having said horizontal margin thereof directly covering portions of said recesses in the plate element to constrain said armature portions to seating in said recesses in the pivotal support of the armature.

2. In a relay, an electromagnet assembly providing magnet poles in opposed, spaced-apart relation, said assembly including a movable armature extending between said magnet poles, and a magnetic supporting frame for the magnet poles, the frame comprising brackets and a plate element bridging the brackets, said plate element having recesses in opposite margins thereof, the armature extending to engagement with said plate element and having portions thereof seated in said recesses, such as to afford thereby a support of the armature for relatively free pivotal movement between said magnet poles, and one of said brackets cooperating with said plate element and the armature to constrain said armature portions to seating in said recesses in the pivotal support of the armature.

3. In a relay, an electromagnet assembly providing magnet poles in opposed, spaced-apart relation, a movable armature between said magnet poles, a magnetic supporting frame for the magnet poles, comprising brackets and a plate element connecting the brackets, said plate element being provided with recesses in opposite margins thereof, said armature extending to end-engagement with said plate element, projections on the armature seated in said plate recesses and affording with said end-engagement of the armature with the plate element, an operative support of the armature for relatively free pivotal movement thereof between said magnet poles, and one of said brackets cooperating with said armature and the plate element in the zone of said recesses, to confine said armature projections to said recesses in the pivotal support of the armature on the plate element.

ONNI LINDFORS.

REFERENCES CITED

The following references are of record in the file of this patent:

UNITED STATES PATENTS

| Number | Name | Date |
|---|---|---|
| 603,624 | Crocker | May 10, 1898 |
| 705,786 | Poppenhusen | July 29, 1902 |
| 850,402 | Scribner | Apr. 16, 1907 |
| 892,158 | Jacobson | June 30, 1908 |
| 972,634 | North | Oct. 11, 1910 |
| 1,714,336 | Yaxley | May 21, 1929 |
| 1,752,900 | Eisenmann | Apr. 1, 1930 |
| 1,861,641 | Nicholson et al. | June 7, 1932 |
| 1,921,127 | Hutt | Aug. 8, 1933 |
| 2,068,682 | Keefe | Jan. 26, 1937 |
| 2,356,836 | Ebert | Aug. 29, 1944 |
| 2,422,764 | Wood | June 24, 1947 |
| 2,431,025 | Buell | Nov. 18, 1947 |